(No Model.) 2 Sheets—Sheet 1.
J. DIVORA.
HARROW.
No. 263,690. Patented Sept. 5, 1882.
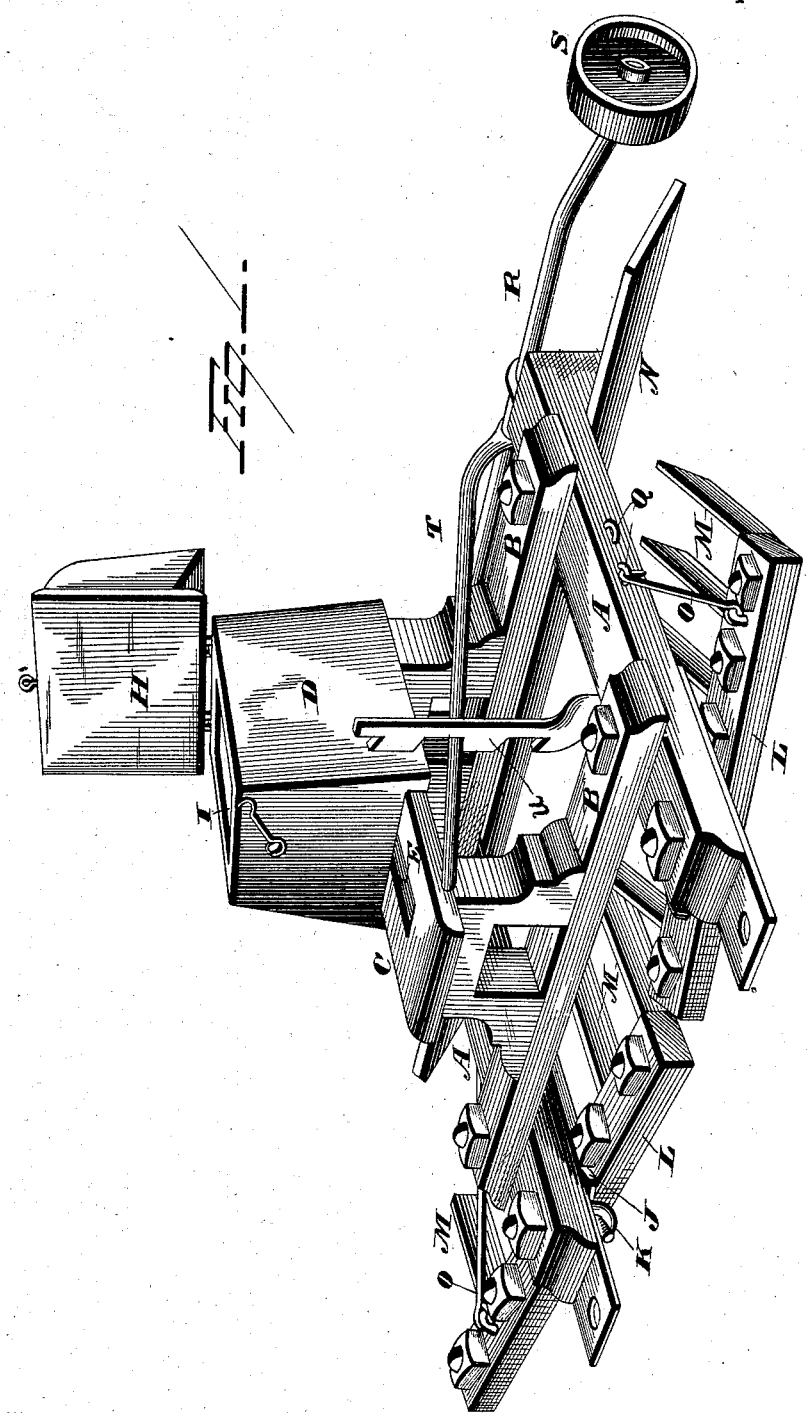
WITNESSES
INVENTOR
Joseph Divora
By H. A. Seymour
Attorney (No Model.) 2 Sheets—Sheet 2.
J. DIVORA.
HARROW.
No. 263,690. Patented Sept. 5, 1882.
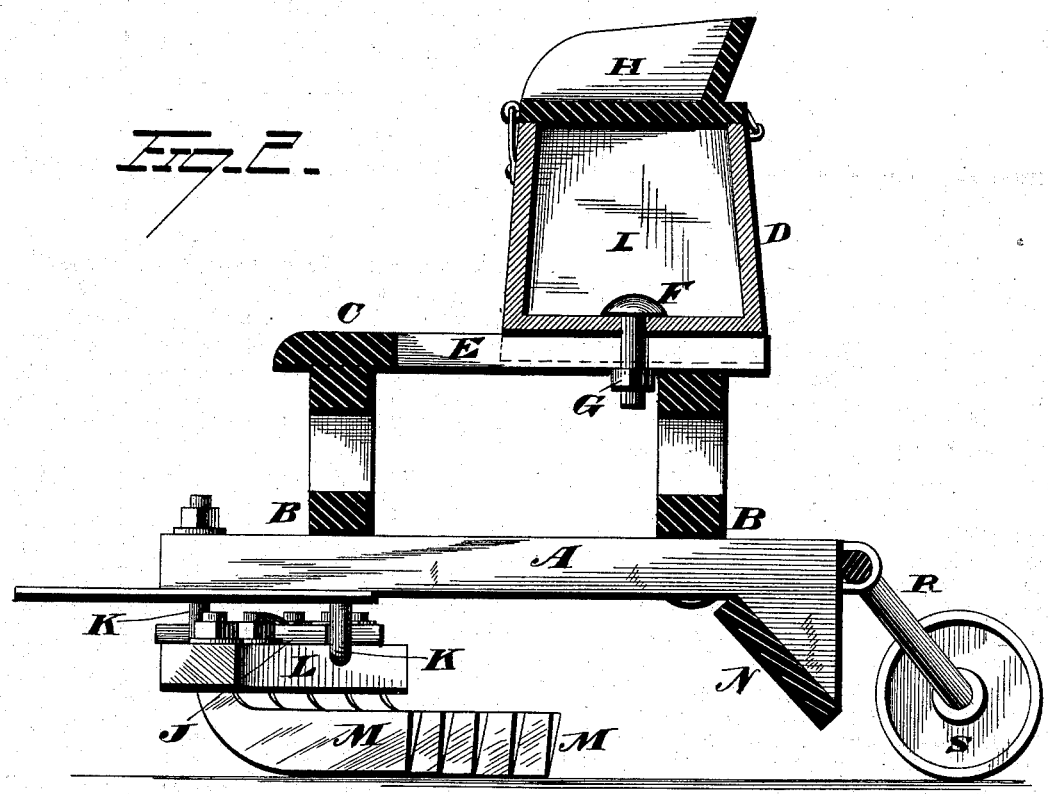
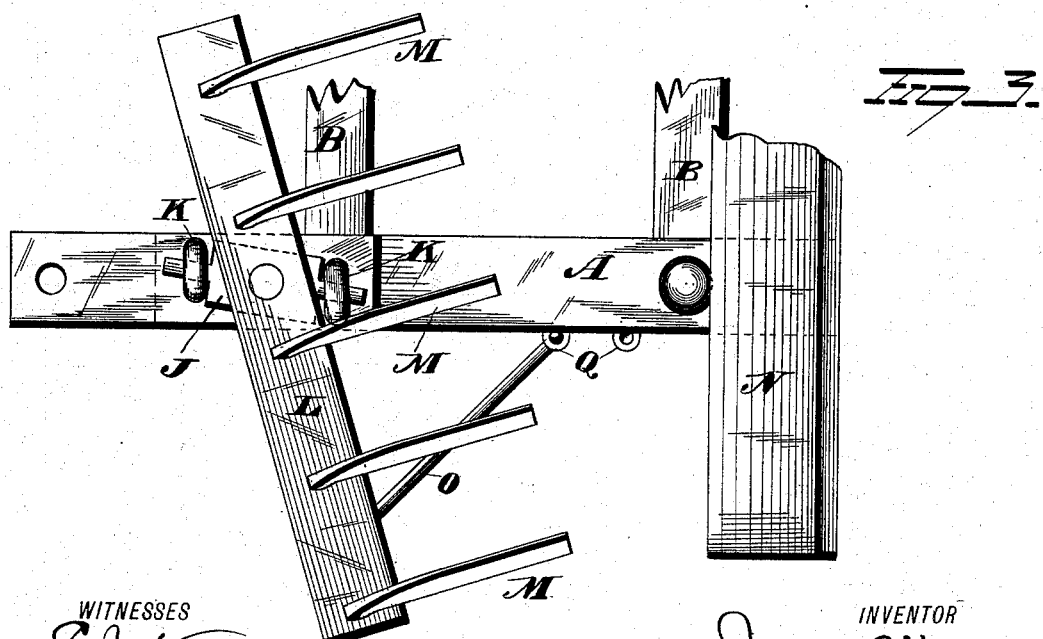
WITNESSES
INVENTOR
Attorney

UNITED STATES PATENT OFFICE.

JOSEPH DIVORA, OF PERU, ILLINOIS.

HARROW.

SPECIFICATION forming part of Letters Patent No. 263,690, dated September 5, 1882.

Application filed May 17, 1882. (No model.)

*To all whom it may concern:*

Be it known that I, JOSEPH DIVORA, of Peru, in the county of La Salle and State of Illinois, have invented certain new and useful Improvements in Harrows; and I do hereby declare the following to be a full, clear, and exact description of the invention, such as will enable others skilled in the art to which it pertains to make and use the same.

My invention relates to an improvement in harrows, the object being to produce a device of this character which shall combine simplicity of construction and ease of operation with durability and efficiency in use. With this object in view my invention consists in certain details of construction and combinations of parts, as will be hereinafter described, and pointed out in the claims.

In the accompanying drawings, Figure 1 is a view, in perspective, of a harrow embodying my invention. Fig. 2 is a view thereof in vertical cross-section, and Fig. 3 is a reverse plan view of one of the harrows.

The harrow-frame is composed of the side beams, A, the cross-beams B, and the elevated platform C, upon which the driver's box D is mounted, the said platform being provided with an elongated slot, E, arranged to receive the bolt F, which secures the box D to the platform. By means of this construction the box may be adjusted on the platform in such manner as to utilize the driver's weight to the best advantage and secure the proper action of the leveler N, as will be presently explained, the box being held in any desired adjustment by the nut G. The sides of the box are extended below its bottom, and thus adapted to guide it in being adjusted on the platform, as described. The seat H is hinged to the box, thereby adapting the inclosed space I to be used for carrying tools and the like.

A harrow is pivotally secured to a rocking plate, J, journaled in bearings K, depending from the lower faces of each of the beams A, said harrows being composed of the frame-pieces L, having inwardly-inclining knives M. These harrows are adjusted relatively to each other, so that they present an obtuse angle to the ground over which they pass. In this position of the harrow the teeth will deflect the loose earth inwardly and bring it within the range of the leveler N, the harrows being sustained in position by the rods O, secured to the beams A near their outer ends, and adapted to be engaged with staples Q, projecting from the beams A. The adjustment of the harrows may be varied to the extent of the scope offered by the said staples.

Aside from the lateral adjustment above described, the harrows have an oscillating movement in virtue of their pivotal attachment to the rocking plates J. A very mobile connection between the harrows and beams is thus obtained, the harrows being thus adapted to conform to the inequalities in the soil being harrowed.

The leveler N consists of a flat plank secured in inclined position to the rear ends of the beams A, its function being to level the earth upturned by the harrow-teeth. Sometimes, however—as, for instance, when the ground is wet or soggy—it is desirable to dispense with the leveler, and to this end provision is made for elevating the frame R, which is pivotally secured to the rear ends of the beams A, small wheels S being mounted on the ends of the frame, which is operated by a lever, T, rigidly secured to it, and extended forward within the reach of the driver when in his seat. To maintain the frame in its depressed position, in which it elevates the leveler, the upright rack $u$ is provided, with which the lever T is engaged. The forward ends of the beams A are provided with suitable devices for the attachment of the draft.

As before intimated, the proper action of the leveler may be secured by adjusting the driver's seat-box. If the soil be light and nearly even, the seat-box should be adjusted well to the front of the frame, so that the leveler will not bear heavily upon the surface, and if the soil be heavy and rough or very uneven the seat-box should be adjusted as far as possible to the rear, so that the weight of the driver will be exerted fully upon the leveler to give it a strong pressure upon the surface of the ground and an efficient leveling action.

I would have it understood that I do not limit myself to the exact construction and combinations of parts herein shown and described, but that I hold myself at liberty to make such changes and alterations as fairly fall within the spirit and scope of my invention.

I am aware that it is not new to provide an agricultural implement with an adjustable seat; and I do not claim, broadly, a harrow having such a seat.

Having fully described my invention, what I claim as new, and desire to secure by Letters Patent, is—

1. In a harrow, the combination, with the harrow-frame consisting of the side bars and cross-bars, of two independent harrows having inwardly-inclined teeth and pivotally secured to rocking plates journaled in bearings depending from the forward ends of the side bars of the frame, substantially as set forth.

2. In a harrow, the combination, with the harrow-frame, of two independent harrows arranged to be laterally adjusted and to have oscillating movement, a leveler located in the rear of the harrows, a frame provided with wheels, and a lever pivotally attached to the rear of the harrow-frame, and a rack with which said lever engages, substantially as set forth.

3. The combination, with the frame having the harrows under its front portion and the leveler secured to its rear end, of the platform extending from the front to rear of the frame, and the driver's seat mounted upon said platform and adjustable thereon in the line of the draft, substantially as and for the purpose set forth.

In testimony whereof I have signed this specification in the presence of two subscribing witnesses.

JOSEPH DIVORA.

Witnesses:
SEBASTIA DIVORA,
JOHN C. WALKER.